(12) United States Patent
Yamanouchi

(10) Patent No.: US 11,086,116 B2
(45) Date of Patent: Aug. 10, 2021

(54) MICROSCOPE OBJECTIVE

(71) Applicant: OLYMPUS CORPORATION, Hachioji (JP)

(72) Inventor: Kazuhiko Yamanouchi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 272 days.

(21) Appl. No.: 16/355,738

(22) Filed: Mar. 16, 2019

(65) Prior Publication Data

US 2019/0324249 A1   Oct. 24, 2019

(30) Foreign Application Priority Data

Apr. 19, 2018 (JP) .............................. JP2018-080950

(51) Int. Cl.
*G02B 21/02* (2006.01)
*G02B 21/33* (2006.01)
*G02B 27/00* (2006.01)

(52) U.S. Cl.
CPC ............. *G02B 21/02* (2013.01); *G02B 21/33* (2013.01); *G02B 27/0025* (2013.01)

(58) Field of Classification Search
CPC ...... G02B 21/02; G02B 21/33; G02B 21/025; G02B 27/0025
USPC ................. 359/368–398, 656–661, 643–647
See application file for complete search history.

(56) References Cited

U.S. PATENT DOCUMENTS

| | | | | |
|---|---|---|---|---|
| 5,502,596 A | * | 3/1996 | Suzuki | G02B 21/02 359/656 |
| 5,982,559 A | | 11/1999 | Furutake et al. | |
| 2006/0279847 A1 | | 12/2006 | Matthae et al. | |
| 2010/0265574 A1 | | 10/2010 | Kasahara | |
| 2016/0116724 A1 | * | 4/2016 | Abe | G02B 21/33 359/656 |
| 2017/0010454 A1 | | 1/2017 | Abe | |

FOREIGN PATENT DOCUMENTS

| | | |
|---|---|---|
| DE | 102005027423 A1 | 12/2006 |
| DE | 102009037743 A1 | 2/2011 |
| JP | H06160720 A | 6/1994 |

(Continued)

OTHER PUBLICATIONS

Extended European Search Report (EESR) dated Sep. 23, 2019 issued European Application No. 19164033.3.

*Primary Examiner* — Travis S Fissel
(74) *Attorney, Agent, or Firm* — Holtz, Holtz & Volek PC

(57) ABSTRACT

An immersion microscope objective includes: a first lens group that has a positive refractive power and includes a first cemented lens consisting of a planoconvex lens having a plane surface facing an object and a meniscus lens having a concave surface facing the object; a second lens group that includes a first cemented triplet lens; a third lens group that includes a second cemented triplet lens; a fourth lens group that includes a second cemented lens with a meniscus shape having a concave surface facing an image; and a fifth lens group that includes a lens having a concave surface facing the object, wherein the immersion microscope objective has a numerical aperture within a range from 1.35 to 1.5. The first and second cemented triplet lenses each consist of a positive lens, a negative lens, and a positive lens.

20 Claims, 7 Drawing Sheets

(56) References Cited

FOREIGN PATENT DOCUMENTS

| | | | |
|---|---|---|---|
| JP | H10274742 | A | 10/1998 |
| JP | 2009075281 | A | 4/2009 |
| JP | 2010271693 | A | 12/2010 |

\* cited by examiner

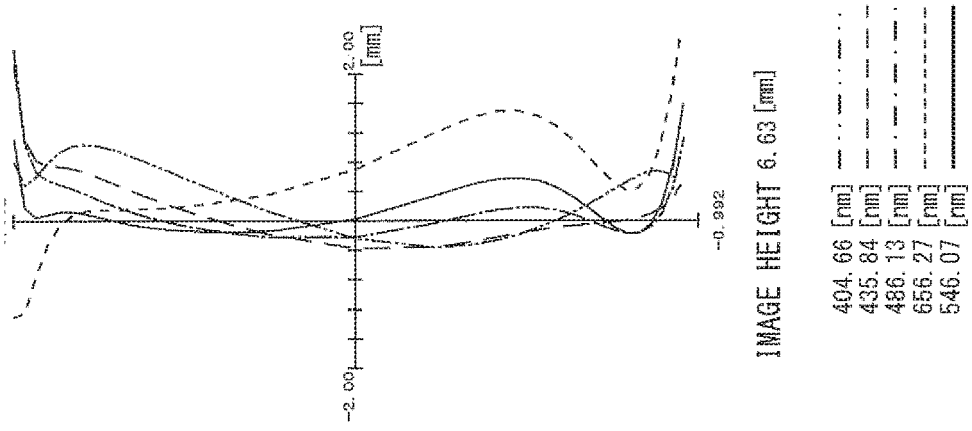
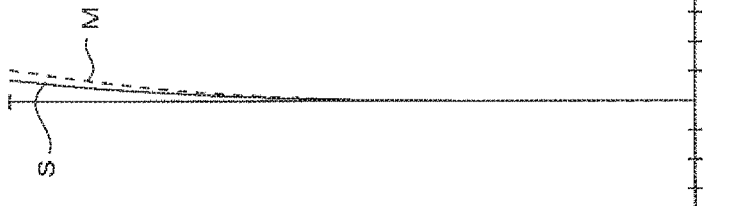
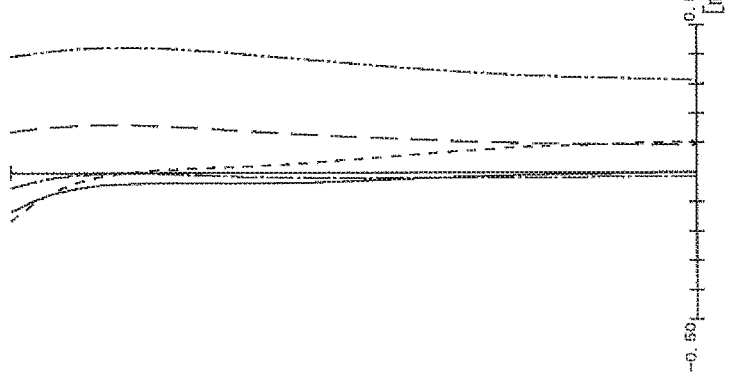
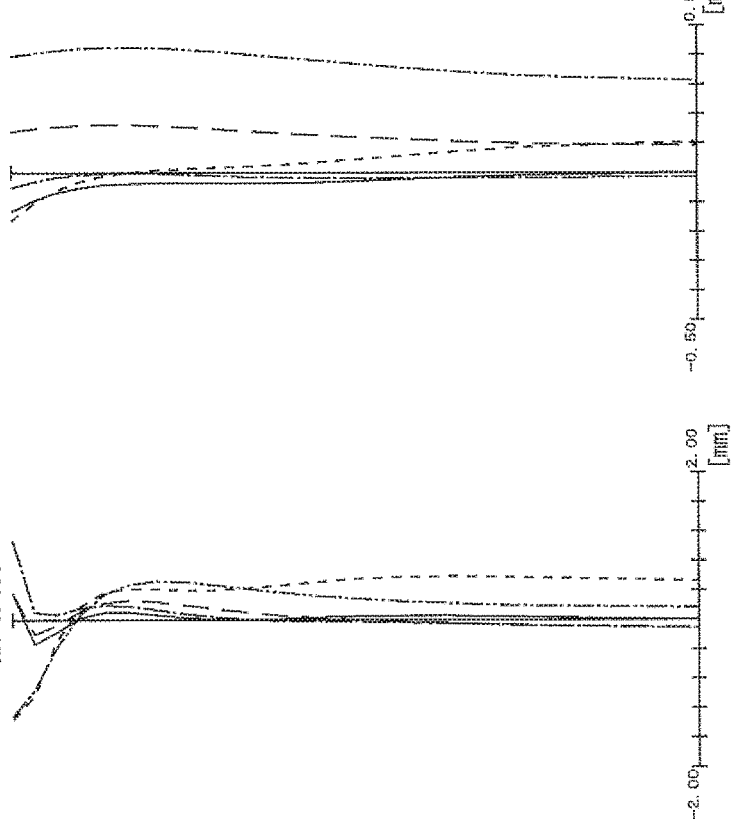

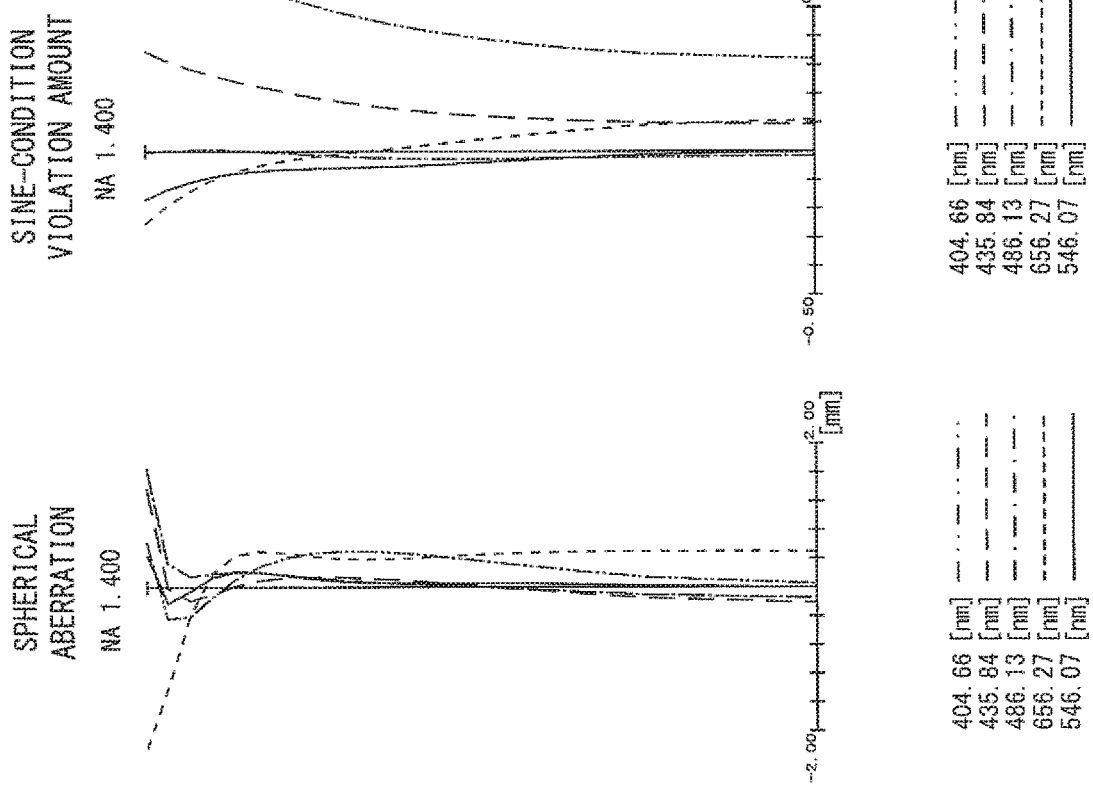

MICROSCOPE OBJECTIVE

CROSS REFERENCE TO RELATED APPLICATIONS

This application is based upon and claims the benefit of priority from prior Japanese Patent Application No. 2018-080950, filed Apr. 19, 2018, the entire contents of which are incorporated herein by this reference.

BACKGROUND OF THE INVENTION

Field of the Invention

The disclosure herein relates to a microscope objective and particularly to an immersion microscope objective.

Description of the Related Art

In recent years, there has been significant development in the pixel count for image sensors, and in the field of biological microscopes, microscope apparatuses have been increasingly expected to allow observation and image capturing to be performed with both an image plane flatness and a high resolution. To achieve such microscope apparatuses, objectives are required to have a preferable image surface flatness and a high resolution for a field of view approximately corresponding to a 40-fold magnification. In addition, a biological microscope will desirably accommodate a fluorescence observation using excitation light having a short wavelength.

Japanese Laid-open Patent Publication No. 06-160720 describes an apochromatic microscope objective with an about 40-fold magnification that has a preferable image plane flatness.

SUMMARY OF THE INVENTION

A microscope objective in accordance with an aspect of the present invention is an immersion microscope objective having a numerical aperture within a range from 1.35 to 1.5. The microscope objective includes: a first lens group that has a positive refractive power and includes a first cemented lens, the first cemented lens consisting of a planoconvex lens having a plane surface facing an object and a meniscus lens having a concave surface facing the object; a second lens group that includes a first cemented triplet lens; a third lens group that includes a second cemented triplet lens; a fourth lens group that includes a second cemented lens with a meniscus shape, the meniscus shape having a concave surface facing an image; and a fifth lens group that includes a lens having a concave surface facing the object, wherein the object, the first lens group, the second lens group, the third lens group, the fourth lens group, and the fifth lens group are arranged in this order. The first and second cemented triplet lenses each consist of a positive lens, a negative lens, and a positive lens, wherein the object, the positive lens, the negative lens, and the positive lens are arranged in this order.

BRIEF DESCRIPTION OF THE DRAWINGS

The present invention will be more apparent from the following detailed description when the accompanying drawings are referenced.

FIGS. 5A-5D are each an aberration diagram for an optical system that consists of an objective 2 depicted in FIG. 4 and a tube lens 10 depicted in FIG. 2;

FIGS. 7A-7D are each an aberration diagram for an optical system that consists of an objective 3 depicted in FIG. 6 and a tube lens 10 depicted in FIG. 2.

DESCRIPTION OF THE EMBODIMENTS

Figure 1:
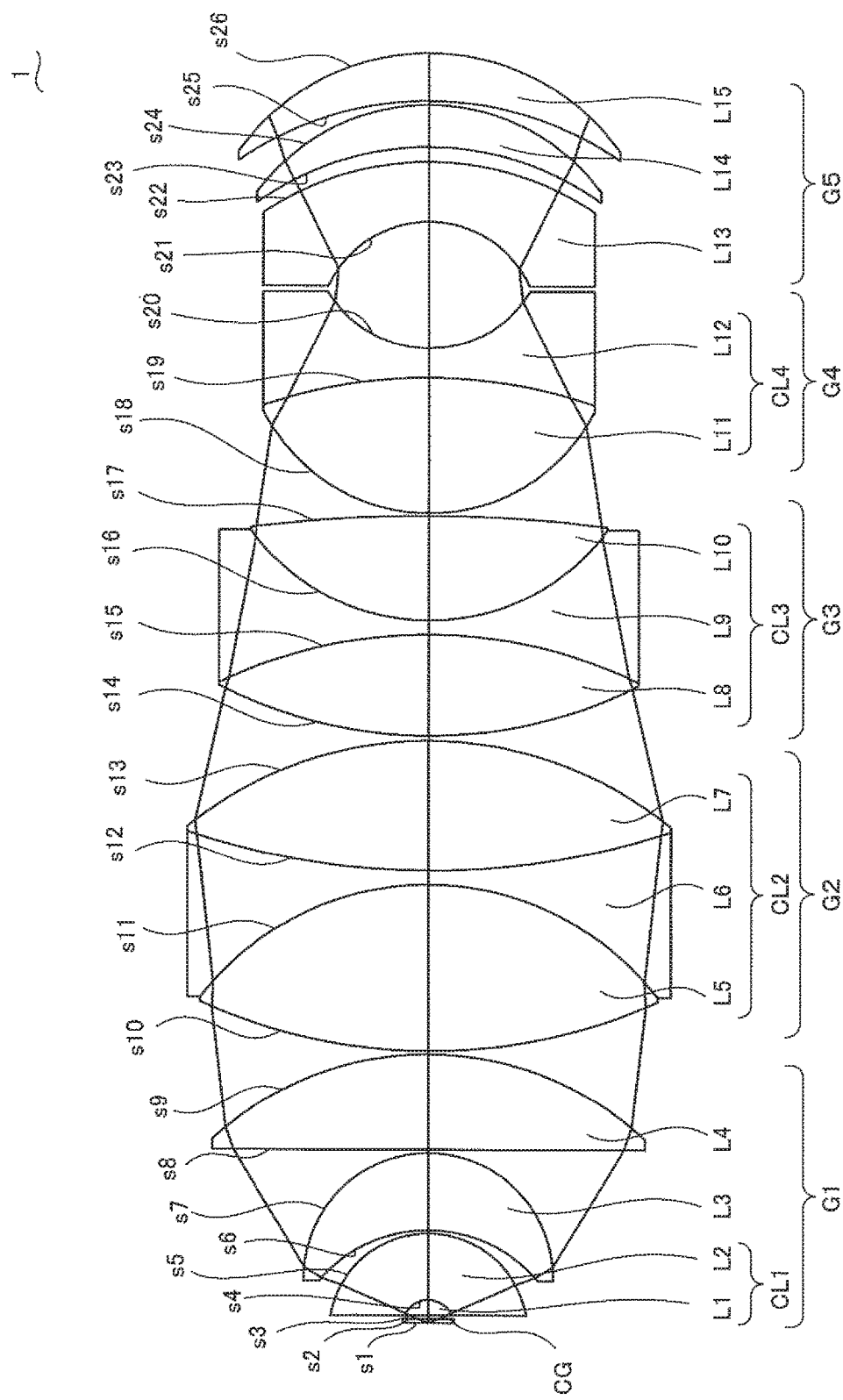
FIG. 1 is a cross-sectional view of an objective 1 in accordance with a first embodiment of the invention.

Conventional objectives such as that described in Japanese Laid-open Patent Publication No. 06-160720 have a numerical aperture of about 1.0 and are required to have a higher resolution.

The following describes an objective in accordance with an embodiment of the present application (hereinafter simply referred to as an objective). The objective in accordance with the embodiment is an infinity-corrected microscope objective used in combination with a tube lens. The objective is what is called an immersion objective and is used to observe a sample S with an immersion liquid interposed between the sample S and the objective. In addition, the objective has a high numerical aperture and, more specifically, a numerical aperture within a range from 1.35 to 1.5.

The objective has a five-group configuration. The objective includes a first lens group that has a positive refractive power, a second lens group, a third lens group, a fourth lens group, and a fifth lens group, wherein an object and the first, second, third, fourth, and fifth lens groups are arranged in this order.

The first lens group include lenses, including a cemented lens that has a plane surface facing the object and is the closest to the object among the lenses of the first lens groups. This cemented lens is hereinafter referred to as a first cemented lens. The first cemented lens includes a planoconvex lens having a plane surface facing the object and a meniscus lens having a concave surface facing the object, wherein the object, the planoconvex lens, and the meniscus lens are arranged in this order.

Under a high numerical aperture condition, the first lens group serves mainly to correct a Petzval sum in a preferable manner while preventing generation of spherical aberrations. Disposing the first cemented lens that includes a meniscus lens within a region located near the object at which a height of marginal ray is low allows the Petzval sum to be corrected effectively. Providing a plane surface as the lens surface that is the closest to the object makes air bubbles unlikely to be trapped between the immersion liquid and the objective.

The second lens group includes a cemented triplet lens. This cemented triplet lens is hereinafter referred to as a first cemented triplet lens. The first cemented triplet lens consists of a positive lens, a negative lens, and a positive lens, wherein the object, the positive lens, the negative lens, and the positive lens are arranged in this order. The first cemented triplet lens may be the closest to the object among the elements of the second lens group. A border between the first and second lens groups may be identified in accordance with this feature.

The second lens group serves mainly to reduce chromatic aberrations. The first cemented triplet lens with a positive-negative-positive configuration allows chromatic aberrations to be corrected effectively while using a space within the objective efficiently. In particular, incorporating the first cemented triplet lens into the second lens group at which a height of marginal ray is high allows chromatic aberrations to be corrected more effectively. Meanwhile, Configuring as a cemented triplet lens a lens component in a region at which a height of marginal ray is high and thus which necessarily has a large effective diameter can have high stiffness for the lens component.

Whether a single lens or a cemented lens, the lens component herein refers to one lens block that includes lens surfaces through which a light ray from an object point passes, wherein only a surface on an object side and a surface on an image side among these lens surfaces, i.e., only two of these lens surfaces, are in contact with air (or immersion liquid).

The third lens group includes a cemented triplet lens. This cemented triplet lens will hereinafter be referred to as a second cemented triplet lens. The second cemented triplet lens consists of a positive lens, a negative lens, and a positive lens, wherein the object, the positive lens, the negative lens, and the positive lens are arranged in this order. The third lens group may include a second cemented triplet lens as a lens that is the closest to the object among the lenses of the third lens group. A border between the second and third lens groups may be identified in accordance with this feature.

As with the second lens group, the third lens group serves mainly to reduce chromatic aberrations. The second cemented triplet lens with a positive-negative-positive configuration allows chromatic aberrations to be corrected effectively while using a space within the objective efficiently. In particular, incorporating the second cemented triplet lens into the third lens group at which a height of marginal ray is high allows chromatic aberrations to be corrected more effectively. Meanwhile, Configuring as a cemented triplet lens a lens components in a region at which a height of marginal ray and thus which necessarily has a large effective diameter can have high stiffness for the lens component.

The fourth lens group includes a cemented lens. This cemented lens will hereinafter be referred to as a second cemented lens. The second cemented lens has a meniscus shape that includes a concave surface facing the image. The fifth lens group includes a lens that has a concave surface facing the object.

The fourth lens group serves mainly to correct coma aberrations in a preferable manner. The fifth lens group serves mainly to correct astigmatisms and coma aberrations in a preferable manner.

The configuration described above allows an immersion microscope objective with an about 40-fold magnification that has both a high image plane flatness and a high resolution to be provided. Note that "about 40-fold magnification" falls within at least a range from 30-fold magnification to 50-fold magnification.

The following describes a desirable configuration of the objective.

The objective desirably satisfies at least one of the following conditional expressions.

$$0.3 \leq n2-n1 \leq 1.0 \tag{1}$$

$$0.6 \leq f/f1 \leq 1.0 \tag{2}$$

$$-0.2 \leq f/f4 \leq 0.2 \tag{3}$$

$$-0.8 \leq Fb/D \leq -0.4 \tag{4}$$

In these conditional expressions, n1 indicates a refractive index that the planoconvex lens included in the first cemented lens has for an e line; n2, a refractive index that the meniscus lens included in the first cemented lens has for the e line; f, a focal length that the objective has for the e line; f1, a focal length that the first lens group has for the e line; f4, a focal length that the forth lens group has for the e line; Fb, a back focus of the objective. The back focus is a distance from the lens surface of the objective that is the closest to the image to a back focal point of the objective, wherein a distance from the object toward the image is defined as a positive distance. D is a distance on an optical axis from the lens surface of the objective that is the closest to the object to the lens surface of the objective that is the closest to the image.

Conditional expression (1) defines a difference in refractive index between the planoconvex lens and meniscus lens that form the first cemented lens. Satisfying conditional expression (1) allows the objective to have a low Petzval sum while maintaining a high numerical aperture.

When n2−n1 is higher than an upper limit of conditional expression (1), a glass material having a remarkably high refractive index would be used for the meniscus lens, thereby decreasing the transmittance. When n2−n1 is lower than a lower limit of conditional expression (1), the radius of curvature of the cemented surface of the first cemented lens is so small that a sufficient negative refractive power to correct the Petzval sum at the cemented surface in a preferable manner cannot be achieved. Thus, spherical aberrations and coma aberrations are worsened.

The objective may be configured to satisfy conditional expression (1-1) or (1-2) instead of conditional expression (1).

$$0.45 \leq n2-n1 \leq 0.9 \tag{1-1}$$

$$0.46 \leq n2-n1 \leq 0.8 \tag{1-2}$$

Conditional expression (2) defines the refractive power of the first lens group. Satisfying conditional expression (2) allows the objective mainly to correct spherical aberrations effectively.

When f/f1 is higher than an upper limit of conditional expression (2), the first lens group has an excessively high refractive power, and hence the concave surfaces of the fourth and fifth lens groups are required to have a high refractive power. Accordingly, it will be difficult to achieve a preferable balance between the spherical aberration and the coma aberration. When f/f1 is lower than a lower limit of conditional expression (2), a ray height becomes excessively high in the second lens group and the following lens groups. Thus, it will be difficult to correct spherical aberrations in a preferable manner.

The objective may be configured to satisfy conditional expression (2-1) or (2-2) instead of conditional expression (2).

$$0.62 \leq f/f1 \leq 0.79 \tag{2-1}$$

$$0.625 \leq f/f1 \leq 0.785 \tag{2-2}$$

Conditional expression (3) defines the refractive power of the fourth lens group. Satisfying conditional expression (3) allows the objective to correct coma aberrations in a preferable manner.

When f/f4 is higher than an upper limit of conditional expression (3), the positive refractive power of the fourth lens group is excessively high, and hence a large coma aberration occurs at the fourth lens group. When f/f4 is lower than a lower limit of conditional expression (3), the negative refractive power of the fourth lens group is excessively high, and hence a large coma aberration occurs at the fourth lens group.

The objective may be configured to satisfy conditional expression (3-1) or (3-2) instead of conditional expression (3).

$$-0.11 \leq f/f4 \leq 0.11 \qquad (3-1)$$

$$-0.10 \leq f/f4 \leq 0.10 \qquad (3-2)$$

Conditional expression (4) defines an appropriate range for the back focus. Satisfying the conditional expression (4) allows the objective to correct spherical aberrations, astigmatisms, and coma aberrations in a preferable manner.

When Fb/D is higher than an upper limit of conditional expression (4), a ray height becomes excessively high in the second and third lens groups. Hence, it is difficult to correct spherical aberrations in a preferable manner. When Fb/D is lower than a lower limit of conditional expression (4), a back focal point located within the objective becomes excessively close to the object. Hence, it is difficult to correct astigmatisms and coma aberrations.

The objective may be configured to satisfy conditional expression (4-1) or (4-2) instead of conditional expression (4).

$$-0.75 \leq Fb/D \leq -0.53 \qquad (4-1)$$

$$-0.70 \leq Fb/D \leq -0.54 \qquad (4-2)$$

The first and second cemented triplet lenses included in the objective each desirably have a positive refractive power. This allows diverging light emitted from the first lens group to be gradually refracted by the second and third lens groups so that converging light can be incident on the fourth lens group.

The first and second cemented triplet lenses are desirably adjacent to each other. This allows both of the first and second cemented triplet lenses to be disposed in a region at which a ray height is high, with the result that chromatic aberrations can be easily corrected in a preferable manner.

In addition, the first lens group desirably includes a single lens that is a meniscus lens having a concave surface facing the object (hereinafter referred to as a single meniscus lens). In this case, the objective desirably further satisfies the following conditional expression.

$$0.5 \leq R5/L2 \leq 0.8 \qquad (5)$$

In this conditional expression, R5 indicates the radius of curvature of the convex surface of the single meniscus lens, and L2 indicates a distance on an optical axis from the lens surface of the microscope objective that is the closest to the object to the convex surface of the single meniscus lens included in the first lens group.

Conditional expression (5) defines the convex surface of the single meniscus lens. Satisfying conditional expression (5) allows the objective to limit the Petzval sum to a low value and limit spherical aberrations to a low degree while maintaining a high numerical aperture.

When R5/L2 is higher than an upper limit of conditional expression (5), the convex surface has an excessively low refractive power, and hence it is difficult to limit the Petzval sum to a low value and limit spherical aberrations to a low degree. When R5/L2 is lower than a lower limit of conditional expression (5), the convex surface has an excessively small radius of curvature. Hence, lens processability is remarkably degraded, resulting in an increase in the cost of manufacture.

The objective may be configured to satisfy conditional expression (5-1) or (5-2) instead of conditional expression (5).

$$0.505 \leq R5/L2 \leq 0.775 \qquad (5-1)$$

$$0.51 \leq R5/L2 \leq 0.77 \qquad (5-2)$$

The objective may use only one of the conditional expressions described above or may use a combination of conditional expressions freely selected from these conditional expressions, and any combination can be used to achieve sufficiently advantageous effects. The upper and lower limits of the conditional expressions may each be independently changed to provide a new conditional expression which will also achieve similar advantageous effects.

The following specifically describes embodiments of the objective.

First Embodiment

FIG. 1 is a cross-sectional view of an objective 1 in accordance with the present embodiment. The objective 1 is an immersion microscope objective and consists of a first lens group G1 that has a positive refractive power, a second lens group G2 that includes a cemented triplet lens CL2, a third lens group G3 that includes a cemented triplet lens CL3, a fourth lens group G4 that consists of a cemented lens CL4, and a fifth lens group G5, wherein an object, the first lens group G1, the second lens group G2, the third lens group G3, the fourth lens group G4, and the fifth lens group G5 are arranged in this order.

The first lens group G1 includes a cemented lens CL1, a lens L3 that is a meniscus lens having a concave surface facing the object, and a lens L4 that is a planoconvex lens having a plane surface facing the object, wherein the object, the cemented lens CL1, the lens L3, and the lens L4 are arranged in this order. The cemented lens CL1 consists of a lens L1 that is a planoconvex lens having a plane surface facing the object and a lens L2 that is a meniscus lens having a concave surface facing the object, wherein the object, the lens L1, and the lens L2 are arranged in this order.

The second lens group G2 consists of a cemented triplet lens CL2. The cemented triplet lens CL2 consists of a biconvex lens L5, a biconcave lens L6, and a biconvex lens L7, wherein the object, the biconvex lens L5, the biconcave lens L6, and the biconvex lens L7 are arranged in this order.

The third lens group G3 consists of a cemented triplet lens CL3. The cemented triplet lens CL3 consists of a biconvex lens L8, a biconcave lens L9, and a biconvex lens L10, wherein the object, the biconvex lens L8, the biconcave lens L9, and the biconvex lens L10 are arranged in this order.

The fourth lens group G4 consists of a cemented lens CL4. The cemented lens CL4 has a meniscus shape having a concave surface facing the image and consists of a biconvex lens L11 and a biconcave lens L12, wherein the object, the biconvex lens L11, and the biconcave lens L12 are arranged in this order.

The fifth lens group G5 consists of a meniscus lens L13 having a concave surface facing the object, a meniscus lens L14 having a concave surface facing the object, and a meniscus lens L15 having a concave surface facing the object, wherein the object, the meniscus lens L13, the meniscus lens L14, and the meniscus lens L15 are arranged in this order.

The following are various data on the objective 1, where NA indicates the numerical aperture of the objective 1 on the object side; β, the magnification of the objective 1 achieved when the objective 1 is combined with a tube lens 10 (descriptions will be given of the tube lens 10 hereinafter); Im.H, an image height; WD, the working distance of the objective 1.

f=4.4999 mm, NA=1.4, β=−39.99, Im.H=13.25 mm, WD=0.1349 mm, n1=1.51825, n2=1.88815, f1=6.0144 mm, f4=−52.2153 mm, Fb=−29.5216 mm, D=49.2771 mm, R5=4.8951 mm, L2=6.322 mm

The following are lens data of the objective 1. INF in the lens data indicates infinity (∞).

Objective 1

| s | r | d | ne | vd |
|---|---|---|---|---|
| 1 | INF | 0.17 | 1.52626 | 54.41 |
| 2 | INF | 0.1349 | 1.51793 | 41 |
| 3 | INF | 0.6 | 1.51825 | 64.14 |
| 4 | −1.02 | 2.5917 | 1.88815 | 40.76 |
| 5 | −3.8939 | 0.125 | | |
| 6 | −5.6526 | 3.0053 | 1.88815 | 40.76 |
| 7 | −4.8951 | 0.125 | | |
| 8 | INF | 3.7417 | 1.57098 | 71.3 |
| 9 | −12.5464 | 0.125 | | |
| 10 | 21.9126 | 6.488 | 1.43986 | 94.66 |
| 11 | −11.4164 | 0.55 | 1.67717 | 38.26 |
| 12 | 30.2053 | 5.0748 | 1.57098 | 71.3 |
| 13 | −15.1549 | 0.2 | | |
| 14 | 18.3595 | 3.9396 | 1.43986 | 94.66 |
| 15 | −19.1693 | 0.55 | 1.64132 | 42.41 |
| 16 | 8.7006 | 4.1 | 1.43986 | 94.66 |
| 17 | −55.4175 | 0.1 | | |
| 18 | 7.3026 | 5.279 | 1.57098 | 71.3 |
| 19 | −20.2873 | 1.1537 | 1.64132 | 42.41 |
| 20 | 4.6287 | 4.9408 | | |
| 21 | −4.3629 | 2.3279 | 1.88815 | 40.76 |
| 22 | −11.7911 | 0.5799 | | |
| 23 | −11.6567 | 1.6421 | 1.68082 | 55.34 |
| 24 | −8.4408 | 0.1517 | | |
| 25 | −13.3247 | 1.8859 | 1.8629 | 24.8 |
| 26 | −9.2174 | | | | s indicates a surface number; r, a radius of curvature (mm); d, a surface interval (mm); ne, a refractive index for an e line; vd, an Abbe number. These marks are also applicable to the embodiments described hereinafter. Surface numbers s1 and s2 respectively indicate an object surface (surface of cover glass CG on an object side) and a surface of the cover glass CG on an image side. Surface numbers s3 and s26 respectively indicate a lens surface of the objective 1 that is the closest to an object and a lens surface of the objective 1 that is the closest to an image. A space between the surface indicated as surface number S2 and the surface indicated as surface number s3 are filled with an immersion liquid.

As indicated in the following, the objective 1 satisfies conditional expressions (1)-(5).

$$n2-n1=0.37 \quad (1)$$

$$f/f1=0.75 \quad (2)$$

$$f/f4=-0.09 \quad (3)$$

$$Fb/D=-0.60 \quad (4)$$

$$R5/L2=0.77 \quad (5)$$

Figure 2:
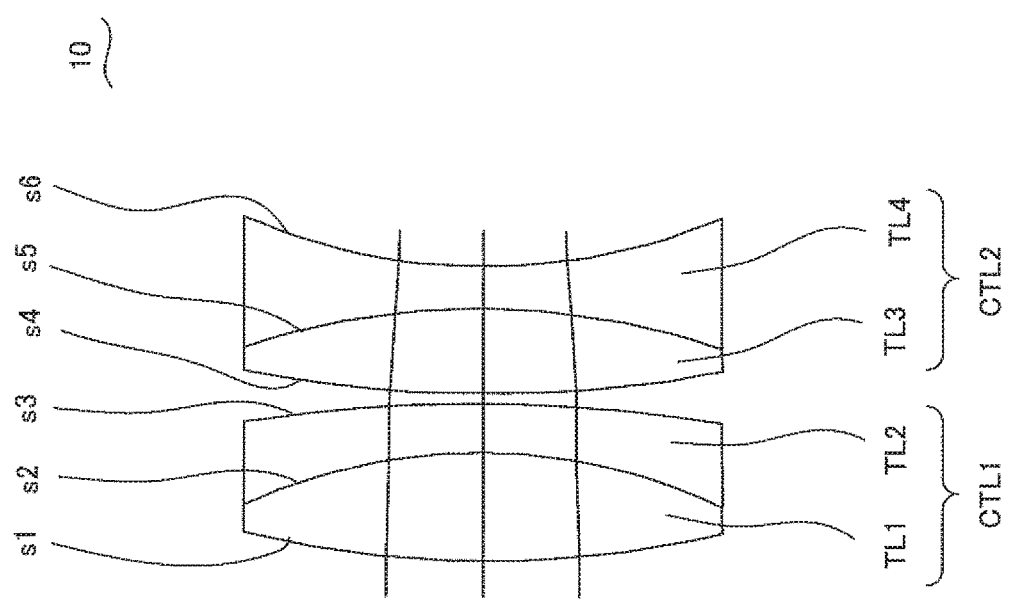
FIG. 2 is a cross-sectional view of a tube lens 10.

FIG. 2 is a cross-sectional view of a tube lens 10 to be used in combination with the objective 1. The tube lens 10 is a microscope tube lens combined with an infinity-corrected objective so as to form an enlarged image of an object. The tube lens 10 consists of a cemented lens CTL1 and a cemented lens CTL2, wherein the object, the cemented lens CTL1, and the cemented lens CTL2 are arranged in this order. The cemented lens CTL1 consists of a lens TL1 that is a biconvex lens and a lens TL2 that is a meniscus lens having a concave surface facing the object. The cemented lens CTL2 consists of a lens TL3 that is a biconvex lens and a lens TL4 that is a biconcave lens. The distance on an optical axis from the lens surface of the objective 1 that is the closest to an image (surface identified as surface number s26) to the lens surface of the tube lens 10 that is the closest to the object (surface identified as surface number s1) is 120 mm. The tube lens 10 has a focal length of 180 mm.

Tube Lens 10

| s | r | d | ne | vd |
|---|---|---|---|---|
| 1 | 68.7541 | 7.7321 | 1.48915 | 70.23 |
| 2 | −37.5679 | 3.4742 | 1.81078 | 40.92 |
| 3 | −102.8477 | 0.6973 | | |
| 4 | 84.3099 | 6.0238 | 1.83932 | 37.16 |
| 5 | −50.7100 | 3.0298 | 1.64824 | 40.82 |
| 6 | 40.6619 | | | |

Figure 3A:
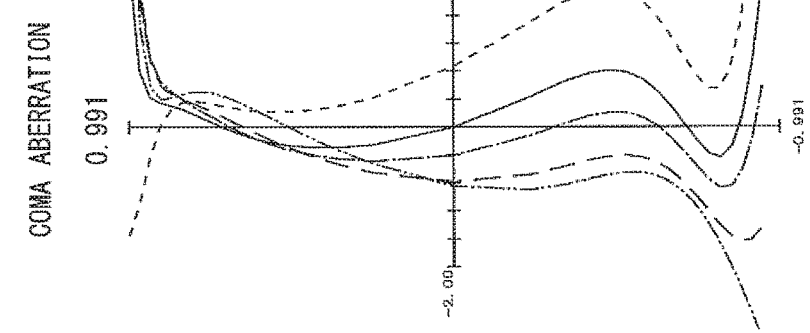
FIGS. 3A-3D are each an aberration diagram for an optical system that consists of an objective 1 depicted in FIG. 1 and a tube lens 10 depicted in FIG. 2.
Figure 3B:
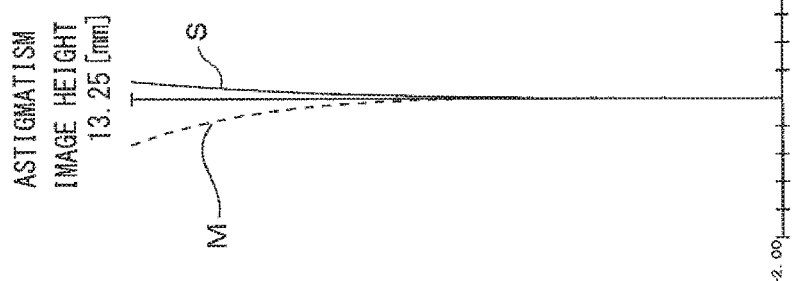
Figure 3C:
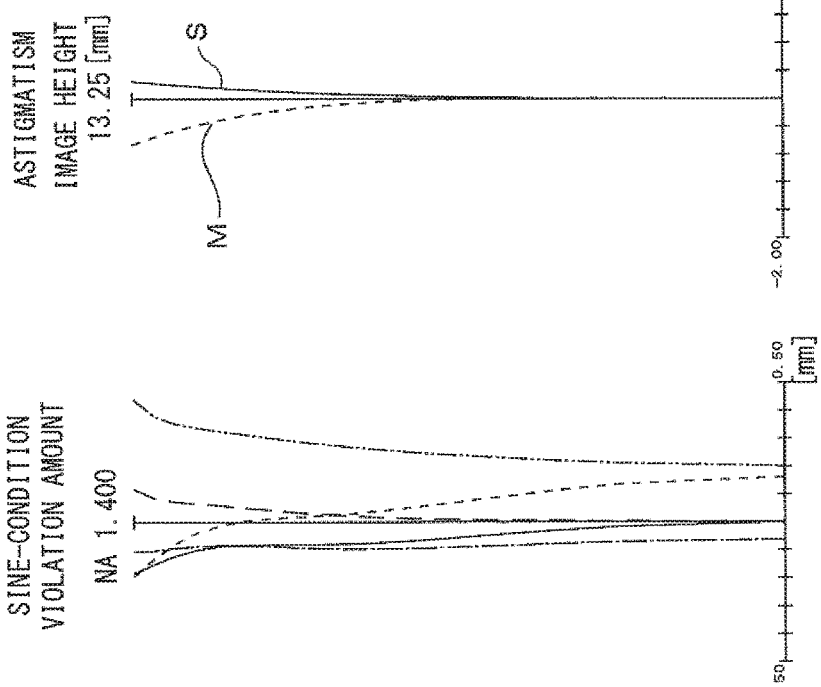
Figure 3D:
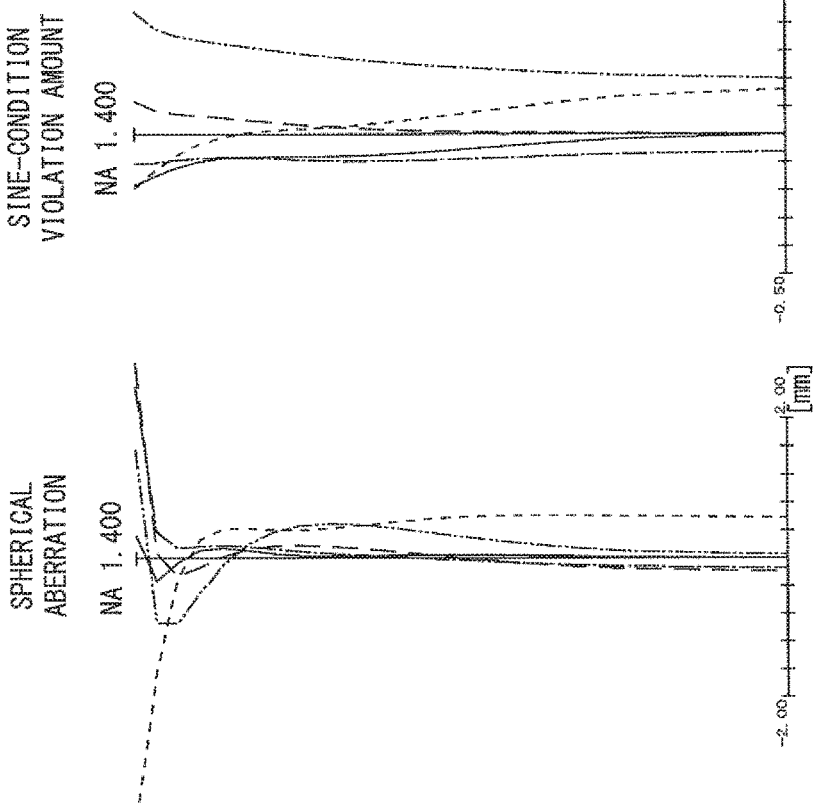

FIGS. 3A-3D are each an aberration diagram for an optical system that consists of the objective 1 and the tube lens 10 and indicate aberrations that occur on an image surface formed by the objective 1 and the tube lens 10. FIG. 3A is a spherical aberration diagram. FIG. 3B illustrates a sine-condition violation amount. FIG. 3C is an astigmatism diagram. FIG. 3D is a coma aberration diagram for an image height ratio of 0.5. "M" in the figures indicates a meridional component, and "S" indicates a sagittal component.

Second Embodiment

Figure 4:
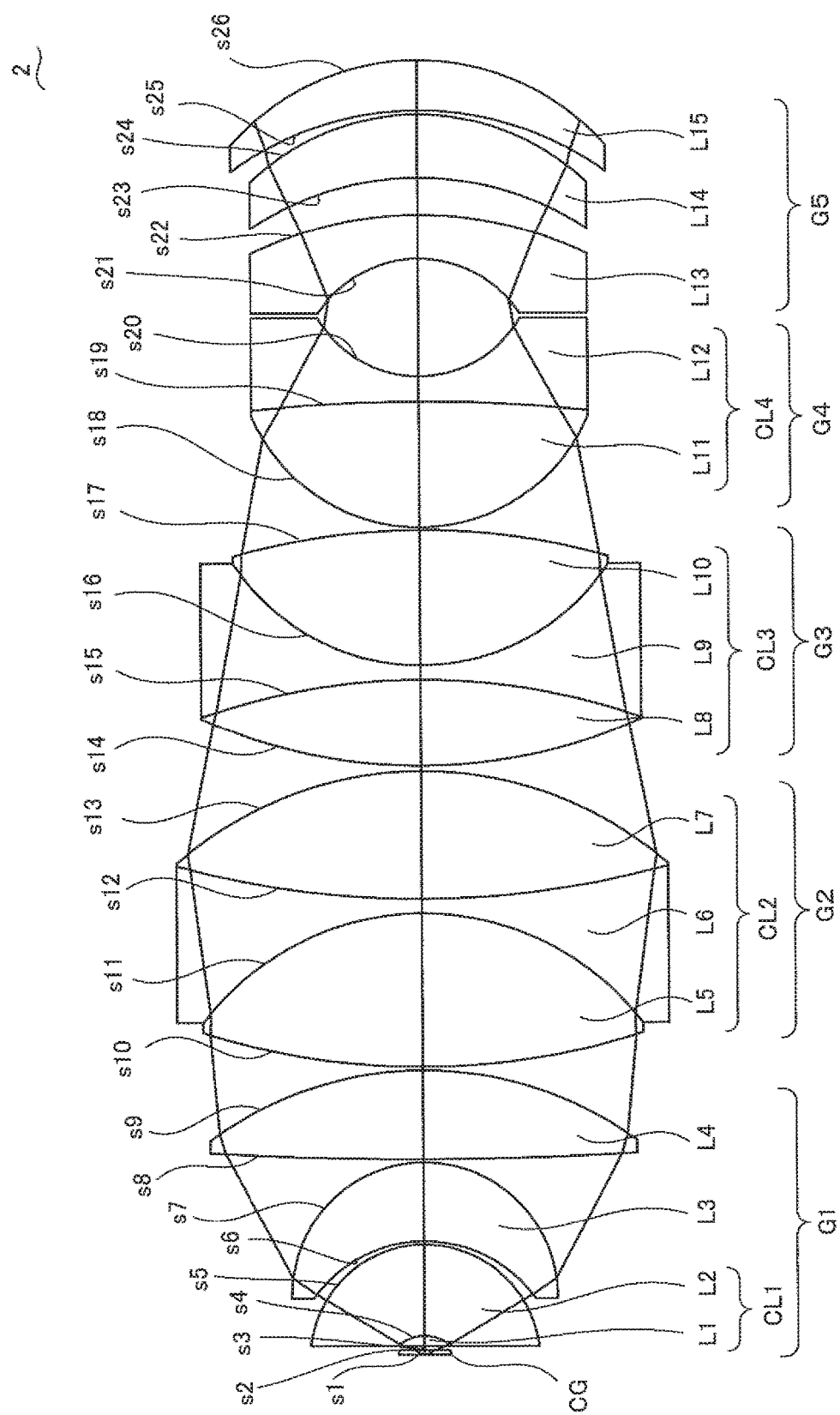
FIG. 4 is a cross-sectional view of an objective 2 in accordance with a second embodiment of the invention.

FIG. 4 is a cross-sectional view of an objective 2 in accordance with the present embodiment. The objective 2 is an immersion microscope objective and consists of a first lens group G1 that has a positive refractive power, a second lens group G2 that includes a cemented triplet lens CL2, a third lens group G3 that includes a cemented triplet lens CL3, a fourth lens group G4 that consists of a cemented lens CL4, and a fifth lens group G5, wherein an object, the first lens group G1, the second lens group G2, the third lens group G3, the fourth lens group G4, and the fifth lens group G5 are arranged in this order.

The first lens group G1 includes a cemented lens CL1, a lens L3 that is a meniscus lens having a concave surface facing the object, and a lens L4 that is a planoconvex lens, wherein the object, the cemented lens CL1, the lens L3, and the lens L4 are arranged in this order. The cemented lens CL1 consists of a lens L1 that is a planoconvex lens having a plane surface facing the object and a lens L2 that is a meniscus lens having a concave surface facing the object, wherein the object, the lens L1, and the lens L2 are arranged in this order.

The second lens group G2 consists of a cemented triplet lens CL2. The cemented triplet lens CL2 consists of a biconvex lens L5, a biconcave lens L6, and a biconvex lens L7, wherein the object, the biconvex lens L5, the biconcave lens L6, and the biconvex lens L7 are arranged in this order.

The third lens group G3 consists of a cemented triplet lens CL3. The cemented triplet lens CL3 consists of a biconvex lens L8, a biconcave lens L9, and a biconvex lens L10, wherein the object, the biconvex lens L8, the biconcave lens L9, and the biconvex lens L10 are arranged in this order.

The fourth lens group G4 consists of a cemented lens CL4. The cemented lens CL4 has a meniscus shape having a concave surface facing the image and consists of a biconvex lens L11 and a biconcave lens L12, wherein the object, the biconvex lens L11, and the biconcave lens L12 are arranged in this order.

The fifth lens group G5 consists of a meniscus lens L13 having a concave surface facing the object, a meniscus lens L14 having a concave surface facing the object, and a meniscus lens L15 having a concave surface facing the object, wherein the object, the meniscus lens L13, the meniscus lens L14, and the meniscus lens L15 are arranged in this order.

The following are various data on the objective 2.
f=4.4999 mm, NA=1.4, β=−39.99, Im.H=13.25 mm, WD=0.1582 mm, n1=1.52458, n2=2.01169, f1=5.7070 mm, f4=−50.5361 mm, Fb=−29.5221 mm, D=49.2544 mm, R5=5.1311 mm, L2=7.0505 mm The following are lens data of the objective 2.
Objective 2

| s | r | d | ne | vd |
|---|---|---|---|---|
| 1 | INF | 0.17 | 1.52626 | 54.41 |
| 2 | INF | 0.1582 | 1.51793 | 41 |
| 3 | INF | 0.4 | 1.52458 | 59.84 |
| 4 | −1.5569 | 3.4899 | 2.01169 | 28.27 |
| 5 | −4.4542 | 0.125 | | |
| 6 | −5.3154 | 3.0356 | 1.83945 | 42.74 |
| 7 | −5.1311 | 0.125 | | |
| 8 | 148.2292 | 3.3954 | 1.57098 | 71.3 |
| 9 | −14.0215 | 0.1291 | | |
| 10 | 28.3662 | 5.8926 | 1.43986 | 94.66 |
| 11 | −10.6868 | 0.55 | 1.67717 | 38.26 |
| 12 | 36.3121 | 4.8864 | 1.57098 | 71.3 |
| 13 | −14.5521 | 0.2 | | |
| 14 | 20.849 | 3.3108 | 1.43986 | 94.66 |
| 15 | −25.747 | 0.5499 | 1.64132 | 42.41 |
| 16 | 8.7011 | 5.1722 | 1.43986 | 94.66 |
| 17 | −26.8537 | 0.1 | | |
| 18 | 7.07 | 4.834 | 1.57098 | 71.3 |
| 19 | −63.0583 | 0.9597 | 1.64132 | 42.41 |
| 20 | 4.5329 | 4.4902 | | |
| 21 | −4.7006 | 1.6889 | 1.92336 | 31.6 |
| 22 | −14.9856 | 1.428 | | |
| 23 | −11.8178 | 2.4163 | 2.01169 | 28.27 |
| 24 | −9.4625 | 0.1543 | | |
| 25 | −12.4297 | 1.9211 | 1.8629 | 24.8 |
| 26 | −9.7165 | | | |

As indicated in the following, the objective 2 satisfies conditional expressions (1)-(5).

$$n2-n1=0.49 \quad (1)$$

$$f/f1=0.79 \quad (2)$$

$$f/f4=-0.09 \quad (3)$$

$$Fb/D=-0.60 \quad (4)$$

$$R5/L2=0.73 \quad (5)$$

FIGS. 5A-5D are each an aberration diagram for an optical system that consists of the objective 2 and the tube lens 10 and indicate aberrations that occur on an image surface formed by the objective 2 and the tube lens 10. FIG. 5A is a spherical aberration diagram. FIG. 5B illustrates a sine-condition violation amount. FIG. 5C is an astigmatism diagram. FIG. 5D is a coma aberration diagram for an image height ratio of 0.5.

Third Embodiment

Figure 6:
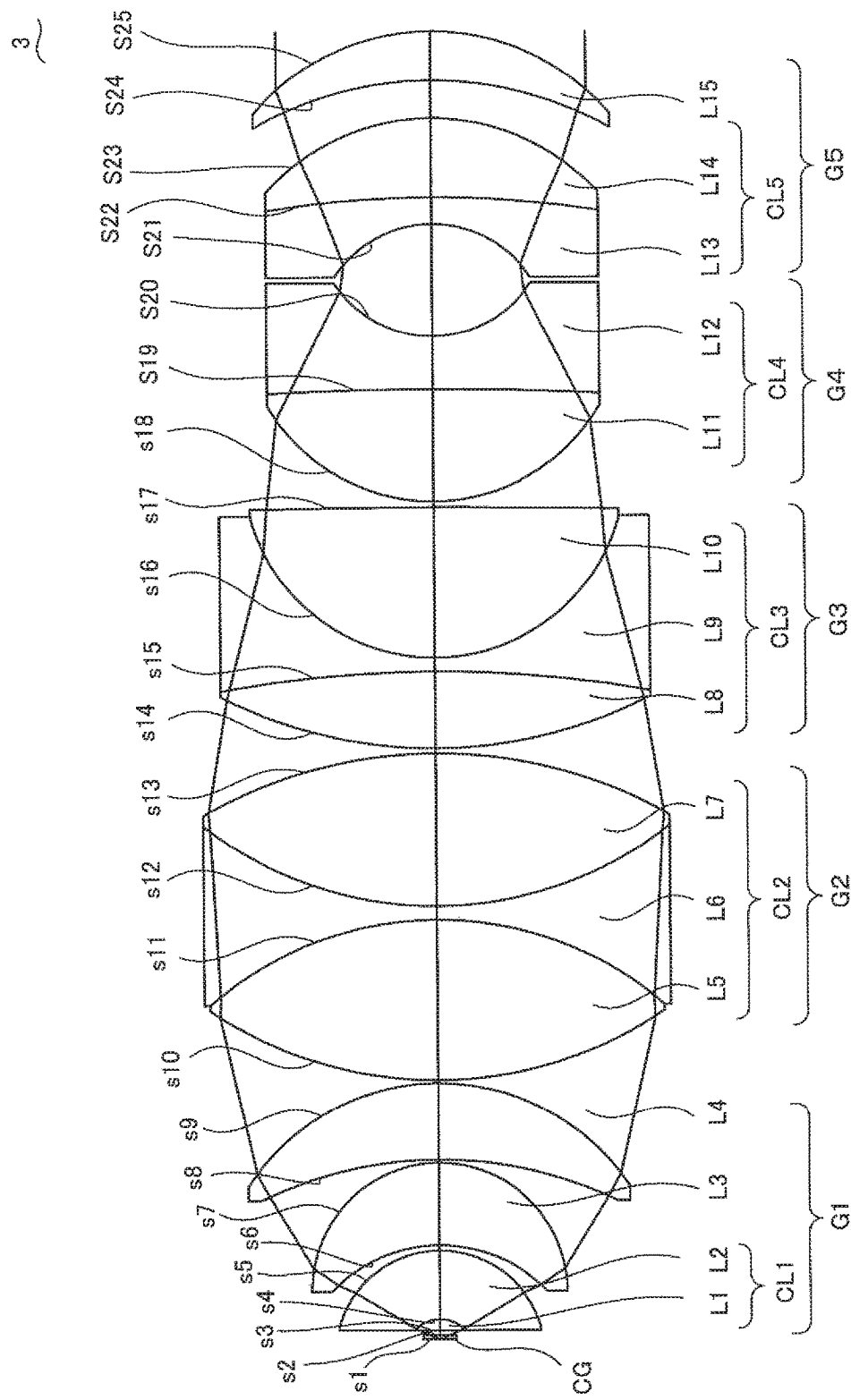
FIG. 6 is a cross-sectional view of an objective 3 in accordance with a third embodiment of the invention.

FIG. 6 is a cross-sectional view of an objective 3 in accordance with the present embodiment. The objective 3 is an immersion microscope objective and consists of a first lens group G1 that has a positive refractive power, a second lens group G2 that includes a cemented triplet lens CL2, a third lens group G3 that includes a cemented triplet lens CL3, a fourth lens group G4 that consists of a cemented lens CL4, and a fifth lens group G5, wherein an object, the first lens group G1, the second lens group G2, the third lens group G3, the fourth lens group G4, and the fifth lens group G5 are arranged in this order.

The first lens group G1 includes a cemented lens CL1, a lens L3 that is a meniscus lens having a concave surface facing the object, and a lens L4 that is a meniscus lens having a concave surface facing the object, wherein the object, the cemented lens CL1, the lens L3, and the lens L4 are arranged in this order. The cemented lens CL1 consists of a lens L1 that is a planoconvex lens having a plane surface facing the object and a lens L2 that is a meniscus lens having a concave surface facing the object, wherein the object, the lens L1, and the lens L2 are arranged in this order.

The second lens group G2 consists of a cemented triplet lens CL2. The cemented triplet lens CL2 consists of a biconvex lens L5, a biconcave lens L6, and a biconvex lens L7, wherein the object, the biconvex lens L5, the biconcave lens L6, and the biconvex lens L7 are arranged in this order.

The third lens group G3 consists of a cemented triplet lens CL3. The cemented triplet lens CL3 consists of a biconvex lens L8, a biconcave lens L9, and a biconvex lens L10, wherein the object, the biconvex lens L8, the biconcave lens L9, and the biconvex lens L10 are arranged in this order.

The fourth lens group G4 consists of a cemented lens CL4. The cemented lens CL4 has a meniscus shape having a concave surface facing the image and consists of a biconvex lens L11 and a biconcave lens L12, wherein the object, the biconvex lens L11, and the biconcave lens L12 are arranged in this order.

The fifth lens group G5 consists of a cemented lens CL5 and a meniscus lens L15 having a concave surface facing the object, wherein the object, the cemented lens CL5, and the meniscus lens L15 are arranged in this order. The cemented lens CL5 consists of a meniscus lens L13 having a concave surface facing the object and a meniscus lens L14 having a concave surface facing the object, wherein the object, the meniscus lens L13, and the meniscus lens L14 are arranged in this order.

The following are various data on the objective 3.
f=4.5000 mm, NA=1.4, β=−39.99, Im.H=13.25 mm, WD=0.1829 mm, n1=1.52458, n2=2.15859, f1=7.1657 mm, f4=−87.7808 mm, Fb=−29.49966 mm, D=52.5296 mm, R5=5.1937 mm, L2=6.7698 mm The following are lens data of the objective 3.
Objective 3

| s | r | d | ne | vd |
|---|---|---|---|---|
| 1 | INF | 0.17 | 1.52626 | 54.41 |
| 2 | INF | 0.1829 | 1.51793 | 41 |
| 3 | INF | 0.45 | 1.52458 | 59.84 |
| 4 | −1.4658 | 2.7768 | 2.15859 | 17.8 |
| 5 | −4.2803 | 0.2119 | | |
| 6 | −6.1045 | 3.3311 | 1.82017 | 46.62 |
| 7 | −5.1937 | 0.125 | | |
| 8 | −16.567 | 3.0976 | 1.57098 | 71.3 |
| 9 | −9.268 | 0.125 | | |

-continued

| s | r | d | ne | vd |
|---|---|---|---|---|
| 10 | 16.6134 | 6.4782 | 1.43986 | 94.66 |
| 11 | −14.1539 | 0.55 | 1.64132 | 42.41 |
| 12 | 15.4508 | 6.185 | 1.57098 | 71.3 |
| 13 | −19.3251 | 0.2 | | |
| 14 | 19.2828 | 3.1086 | 1.57098 | 71.3 |
| 15 | −48.8922 | 0.55 | 1.64132 | 42.41 |
| 16 | 7.7734 | 6.0862 | 1.43986 | 94.66 |
| 17 | −387.156 | 0.2365 | | |
| 18 | 7.8039 | 4.5347 | 1.59732 | 67.74 |
| 19 | −135.9473 | 2.1485 | 1.61669 | 44.27 |
| 20 | 4.783 | 4.5371 | | |
| 21 | −4.8061 | 1.0802 | 1.82017 | 46.62 |
| 22 | −42.8204 | 3.1904 | 1.53947 | 74.7 |
| 23 | −9.122 | 1.5268 | | |
| 24 | −14.6738 | 2 | 1.8629 | 24.8 |
| 25 | −9.5466 | | | |

As indicated in the following, the objective 3 satisfies conditional expressions (1)-(5).

$$n2-n1=0.63 \qquad (1)$$

$$f/f1=0.63 \qquad (2)$$

$$f/f4=-0.05 \qquad (3)$$

$$Fb/D=-0.56 \qquad (4)$$

$$R5/L2=0.77 \qquad (5)$$

FIGS. 7A-7D are each an aberration diagram for an optical system that consists of the objective 3 and the tube lens 10 and indicate aberrations that occur on an image surface formed by the objective 3 and the tube lens 10. FIG. 7A is a spherical aberration diagram. FIG. 7B illustrates a sine-condition violation amount. FIG. 7C is an astigmatism diagram. FIG. 7D is a coma aberration diagram for an image height ratio of 0.5.

What is claimed is:

1. An immersion microscope objective comprising:
a first lens group that has a positive refractive power and includes a first cemented lens, the first cemented lens consisting of a planoconvex lens having a plane surface facing an object and a meniscus lens having a concave surface facing the object;
a second lens group that includes a first cemented triplet lens;
a third lens group that consists of a second cemented triplet lens;
a fourth lens group that consists of a second cemented lens with a meniscus shape, the meniscus shape having a concave surface facing an image; and
a fifth lens group that includes a lens having a concave surface facing the object, wherein
the object, the first lens group, the second lens group, the third lens group, the fourth lens group, and the fifth lens group are arranged in this order,
the immersion microscope objective has a numerical aperture within a range from 1.35 to 1.5,
the first and second cemented triplet lenses each consist of a positive lens, a negative lens, and a positive lens, and the object, the positive lens, the negative lens, and the positive lens are arranged in this order,
the second cemented triplet lens of the third lens group is arranged immediately adjacent to the second cemented lens of the fourth lens group, without any other components arranged therebetween, and
the concave surface of the second cemented lens of the fourth lens group facing the image is arranged immediately adjacent to the concave surface of the lens included in the fifth lens group facing the object, without any other components arranged therebetween.

2. The immersion microscope objective of claim 1, wherein
the immersion microscope objective satisfies the following conditional expression:

$$0.3 \le n2-n1 \le 1.0 \qquad (1)$$

where n1 indicates a refractive index that the planoconvex lens included in the first cemented lens has for an e line, and n2 indicates a refractive index that the meniscus lens included in the first cemented lens has for the e line.

3. The immersion microscope objective of claim 1, wherein
the immersion microscope objective satisfies the following conditional expression:

$$0.6 \le f/f1 \le 1.0 \qquad (2)$$

where f indicates a focal length that the immersion microscope objective has for an e line, and f1 indicates a focal length that the first lens group has for the e line.

4. The immersion microscope objective of claim 2, wherein
the immersion microscope objective satisfies the following conditional expression:

$$0.6 \le f/f1 \le 1.0 \qquad (2)$$

where f indicates a focal length that the immersion microscope objective has for the e line, and f1 indicates a focal length that the first lens group has for the e line.

5. The immersion microscope objective of claim 1, wherein
the immersion microscope objective satisfies the following conditional expression:

$$-0.2 \le f/f4 \le 0.2 \qquad (3)$$

where f indicates a focal length that the immersion microscope objective has for an e line, and f4 indicates a focal length that the fourth lens group has for the e line.

6. The immersion microscope objective of claim 2, wherein
the immersion microscope objective satisfies the following conditional expression:

$$-0.2 \le f/f4 \le 0.2 \qquad (3)$$

where f indicates a focal length that the immersion microscope objective has for the e line, and f4 indicates a focal length that the forth fourth lens group has for the e line.

7. The immersion microscope objective of claim 3, wherein
the immersion microscope objective satisfies the following conditional expression:

$$-0.2 \le f/f4 \le 0.2 \qquad (3)$$

where f indicates the focal length that the immersion microscope objective has for the e line, and f4 indicates a focal length that the forth fourth lens group has for the e line.

8. The immersion microscope objective of claim 4, wherein
the immersion microscope objective satisfies the following conditional expression:

$$-0.2 \leq f/f4 \leq 0.2 \quad (3)$$

where f indicates the focal length that the immersion microscope objective has for the e line, and f4 indicates a focal length that the forth fourth lens group has for the e line.

9. The immersion microscope objective of claim 1, wherein
the immersion microscope objective satisfies the following conditional expression:

$$-0.8 \leq Fb/D \leq -0.4 \quad (4)$$

where Fb indicates a back focus of the immersion microscope objective, and D is a distance on an optical axis from a lens surface of the immersion microscope objective that is closest to the object to a lens surface of the immersion microscope objective that is closest to the image.

10. The immersion microscope objective of claim 2, wherein
the immersion microscope objective satisfies the following conditional expression:

$$-0.8 \leq Fb/D \leq -0.4 \quad (4)$$

where Fb indicates a back focus of the immersion microscope objective, and D is a distance on an optical axis from a lens surface of the immersion microscope objective that is closest to the object to a lens surface of the immersion microscope objective that is closest to the image.

11. The immersion microscope objective of claim 3, wherein
the immersion microscope objective satisfies the following conditional expression:

$$-0.8 \leq Fb/D \leq -0.4 \quad (4)$$

where Fb indicates a back focus of the immersion microscope objective, and D is a distance on an optical axis from a lens surface of the immersion microscope objective that is closest to the object to a lens surface of the immersion microscope objective that is closest to the image.

12. The immersion microscope objective of claim 4, wherein
the immersion microscope objective satisfies the following conditional expression:

$$-0.8 \leq Fb/D \leq -0.4 \quad (4)$$

where Fb indicates a back focus of the immersion microscope objective, and D is a distance on an optical axis from a lens surface of the immersion microscope objective that is closest to the object to a lens surface of the immersion microscope objective that is closest to the image.

13. The immersion microscope objective of claim 5, wherein
the immersion microscope objective satisfies the following conditional expression:

$$-0.8 \leq Fb/D \leq -0.4 \quad (4)$$

where Fb indicates a back focus of the immersion microscope objective, and D is a distance on an optical axis from a lens surface of the immersion microscope objective that is closest to the object to a lens surface of the immersion microscope objective that is closest to the image.

14. The immersion microscope objective of claim 6, wherein
the immersion microscope objective satisfies the following conditional expression:

$$-0.8 \leq Fb/D \leq -0.4 \quad (4)$$

where Fb indicates a back focus of the immersion microscope objective, and D is a distance on an optical axis from a lens surface of the immersion microscope objective that is closest to the object to a lens surface of the immersion microscope objective that is closest to the image.

15. The immersion microscope objective of claim 7, wherein
the immersion microscope objective satisfies the following conditional expression:

$$-0.8 \leq Fb/D \leq -0.4 \quad (4)$$

where Fb indicates a back focus of the immersion microscope objective, and D is a distance on an optical axis from a lens surface of the immersion microscope objective that is closest to the object to a lens surface of the immersion microscope objective that is closest to the image.

16. The immersion microscope objective of claim 8, wherein
the immersion microscope objective satisfies the following conditional expression:

$$-0.8 \leq Fb/D \leq -0.4 \quad (4)$$

where Fb indicates a back focus of the immersion microscope objective, and D is a distance on an optical axis from a lens surface of the immersion microscope objective that is closest to the object to a lens surface of the immersion microscope objective that is closest to the image.

17. The immersion microscope objective of claim 1, wherein
the first cemented triplet lens has a positive refractive power, and
the second cemented triplet lens has a positive refractive power.

18. The immersion microscope objective of claim 2, wherein
the first cemented triplet lens has a positive refractive power, and
the second cemented triplet lens has a positive refractive power.

19. The immersion microscope objective of claim 1, wherein
the first and second cemented triplet lenses are adjacent to each other.

20. The immersion microscope objective of claim 1, wherein
the first lens group further includes a single lens that is a meniscus lens having a concave surface facing the object, and
the immersion microscope objective satisfies the following conditional expression:

$$0.5 \leq R5/L2 \leq 0.8 \quad (5)$$

where R5 indicates a magnitude of a radius of curvature of the convex surface of the single lens, and L2 indicates a distance on an optical axis from the lens surface of the immersion microscope objective that is the closest to the object to the convex surface of the single lens.

\* \* \* \* \*